(12) United States Patent
Shah et al.

(10) Patent No.: US 6,523,013 B2
(45) Date of Patent: *Feb. 18, 2003

(54) METHOD AND APPARATUS FOR PERFORMING AUTOMATED FRAUD REPORTING

(75) Inventors: Chandrakant J. Shah, Stockton, CA (US); David A. Coolidge, Berkeley, CA (US)

(73) Assignee: Neopost, Inc., Hayward, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 20 days.

(21) Appl. No.: 09/122,420

(22) Filed: Jul. 24, 1998

(65) Prior Publication Data

US 2002/0010688 A1 Jan. 24, 2002

(51) Int. Cl.⁷ .............................................. G06F 17/00
(52) U.S. Cl. ....................................................... 705/410
(58) Field of Search .................. 705/400, 404, 705/405, 410, 403, 63, 60, 61; 380/51, 55

(56) References Cited

U.S. PATENT DOCUMENTS

| | | | |
|---|---|---|---|
| 4,447,890 A | | 5/1984 | Duwel et al. |
| 4,657,697 A | | 4/1987 | Chiang |
| 4,697,182 A | * | 9/1987 | Swanson ............... 340/870.02 |
| 4,725,718 A | | 2/1988 | Sansone et al. |
| 4,742,469 A | * | 5/1988 | Haines et al. ............... 705/403 |
| 4,743,747 A | | 5/1988 | Fougere et al. |
| 4,757,537 A | | 7/1988 | Edelmann et al. |
| 4,775,246 A | | 10/1988 | Edelmann et al. |
| 4,812,994 A | | 3/1989 | Taylor et al. |
| 4,813,912 A | | 3/1989 | Chickneas et al. |
| 4,831,555 A | | 5/1989 | Sansone et al. |
| 4,853,865 A | | 8/1989 | Sansone et al. |
| 4,853,961 A | | 8/1989 | Pastor |

(List continued on next page.)

FOREIGN PATENT DOCUMENTS

| | | | |
|---|---|---|---|
| DE | 299 14 577 U1 | * | 12/1999 |
| EP | 825 565 A2 | | 2/1998 |
| EP | 845 762 A2 | | 6/1998 |
| GB | 1 536 403 | | 12/1978 |
| WO | WO 98/13790 A1 | | 4/1998 |
| WO | WO 98/20461 A2 | | 5/1998 |
| WO | WO 00/49580 A1 | | 8/2000 |

OTHER PUBLICATIONS

No author; SPYRUS Unveils New Desktop Security for Electronic Postage Metering; Jan. 1998; Business Wire, p01120360; Dialog@eb copy pp. 1–3.*

"Information–Based Indicia Program (IBIP), Performance Criteria for Information–Based Indicia and Security Architecture for Closed IBI Postage Metering Systems (PCIBI–C)" Jan. 12, 1999, United States Postal Service, dated Jan. 12, 1999.

(List continued on next page.)

Primary Examiner—Thomas A. Dixon
(74) Attorney, Agent, or Firm—Townsend and Townsend and Crew LLP

(57) ABSTRACT

A meter and/or base (or computer), coupled to one or more modems, perform automated fraud reporting to a service center upon detection of particular ones of detectable faults. Diagnostic software and/or tamper detection devices test the meter to ensure that the meter operates in an expected manner. A detected fault can be classified into one or more categories or levels. For faults within certain levels, an alarm message is sent to the service center. Corrective action can be performed in accordance with a response from the service center. For major faults, the meter can be disabled until service is performed and the alarm message can be sent to the postal inspectors.

34 Claims, 3 Drawing Sheets

U.S. PATENT DOCUMENTS

| | | |
|---|---|---|
| 4,949,381 A | 8/1990 | Pastor |
| 5,077,660 A | 12/1991 | Haines et al. ............... 705/410 |
| 5,107,455 A | 4/1992 | Haines et al. .................. 710/8 |
| 5,142,577 A | 8/1992 | Pastor |
| 5,181,245 A | 1/1993 | Jones |
| 5,231,668 A | 7/1993 | Kravitz |
| 5,280,531 A | 1/1994 | Hunter |
| 5,377,268 A | 12/1994 | Hunter |
| 5,448,641 A | 9/1995 | Pintsov et al. |
| 5,612,884 A | 3/1997 | Haines ...................... 705/403 |
| 5,625,694 A | 4/1997 | Lee et al. |
| 5,638,442 A | 6/1997 | Gargiulo et al. |
| 5,666,421 A | 9/1997 | Pastor et al. |
| 5,688,056 A | 11/1997 | Peyret |
| 5,696,829 A | 12/1997 | Cordery et al. .............. 380/55 |
| 5,715,164 A | 2/1998 | Liechti et al. |
| 5,737,426 A | 4/1998 | Brookner et al. ............ 380/51 |
| 5,742,683 A | 4/1998 | Lee et al. |
| 5,781,438 A | 7/1998 | Lee et al. |
| 5,793,867 A | 8/1998 | Cordery et al. |
| 5,799,093 A * | 8/1998 | French et al. ................. 380/51 |
| 5,822,738 A | 10/1998 | Shah et al. |
| 5,920,850 A | 7/1999 | Hunter et al. |
| 5,963,928 A * | 10/1999 | Lee ........................... 705/401 |
| 6,043,642 A * | 3/2000 | Martin et al. ............... 324/142 |
| 6,098,032 A * | 8/2000 | Brookner ................... 702/182 |

OTHER PUBLICATIONS

"Information Based Indicia Program (IBIP) Indicium Specification," United States Postal Service, dated Jun. 13, 1996.

Information Based Indica Program Postal Security Device Specification, United States Postal Service, dated Jun. 13, 1996.

"Information Based Indicia Program Host System Specification [Draft]," United States Postal Service, dated Oct. 9, 1996.

"Information–Based Indicia Program (IBIP), Performance Criteria for Information–Based Indicia and Security Architecture for IBI Postage Metering Systems (PCIBISAIBI-PMS)," United States Postal Service, dated Aug. 19, 1998.

United States Postal Service, "Performance Criteria For Information–Based Indica And Security Architecture For Open IBI Postage Evidencing Systems," Information Based Indicia Program (IBIP), Jun. 25, 1999 XP–002161216.

Barker–Benfield, "First Union Offers Online Transactions," *Florida Times–Union,* Jan. 28. 1994.

FIBS Pub 140–1, Federal Information Processing Standards Publication, (Jan. 11, 1994) Security Requirements for Cryptographic Modules, U.S. Department of Commerce, Ronald H. Brown, Secretary, National Institute of Standards and Technology; pp: 1–51.

* cited by examiner

METHOD AND APPARATUS FOR PERFORMING AUTOMATED FRAUD REPORTING

CROSS REFERENCE TO RELATED APPLICATIONS

The following commonly-owned application is copending and is incorporated by reference into this application in its entirety:

"METHOD AND APPARATUS FOR PLACING AUTOMATED SERVICE CALL FOR POSTAGE METER AND BASE" U.S. application Ser. No. 09/122,168 filed Jul. 24, 1998, having Chandrakant J. Shah as inventor.

BACKGROUND OF THE INVENTION

The present invention relates to postage metering systems. More particularly, the present invention relates to a novel and improved method and apparatus for performing automated fraud reporting.

A postage meter allows a user to print postage or other indicia of value on envelopes or other media. The postage meter can be leased or rented from a commercial group (e.g., Neopost). Typically, the user purchases a fixed amount of value beforehand and the meter is programmed with this amount. Subsequently, the user is allowed to print postage up to the programmed amount.

Because the meter is capable of printing postage having a value, security is critical to prevent unauthorized use. The meter typically includes a print mechanism and mechanical arrangements and/or electronic control circuitry that direct the operation of the print mechanism. The print mechanism and control circuitry are usually enclosed in a secured housing that prevents tampering with the meter and unauthorized access by anyone except for authorized factory technicians. The control circuitry can contain sensors that detect tampering with the meter and flag such condition. Examples of secured postage meters are disclosed.

With the advent of electronic control circuitry, meter security is typically provided by digital signature, encryption, and other techniques. These techniques allow for electronic detection of meter tampering, e.g., attempts to modify the normal operation of the accounting registers used to store value.

The electronic control circuitry also enables the meter to perform other diagnostic functions. For example, in U.S. Pat. No. 4,742,469, entitled "ELECTRONIC METER CIRCUITRY", issued May 3, 1988, assigned to the assignee of the present invention and incorporated herein by reference, the meter is able to detect component failures within the meter and to flag such conditions.

The meter of the '469 patent has the ability to detect multiple types of failure, e.g., "hard" and "soft" faults. Hard faults include failures that threaten the security of the system and/or failure of important hardware. When such faults are detected, a fault code is written into a memory and the meter is locked to prevent further operation until it has been returned to the factory for service. An error message is then displayed on a display to warn the user of the problem and to prompt the user to make a service call to the factory or service center. The user then places the service call through a conventional telephone system.

Soft faults include conditions that pose no potential threat to the security or integrity of the meter. Soft faults can include conditions that are defined in the software as temporary or transitory in nature. For soft faults, the meter displays the error code on the display, writes the error code to memory for later diagnostics, and enters a loop in which it monitors the detected failure condition. The display can prompt the user to make a service call. If the failure condition disappears, the meter resumes operation.

The fraud reporting mechanism of currently available meters tends to be crude in nature. In some meter designs, the display screen is limited to a few alphanumeric characters, just enough to report the error code. The user and service technician then reference a chart that accompanies the meter to determine the type of failure based on the reported error code. In other meter designs, the meter displays an error message such as "Call Service". However, in all these designs, the user must make the necessary service call.

This reporting mechanism is inadequate for a number of reasons. First, the fault condition may not be noticed by the user in a timely manner and the reporting delay can result in loss of use to the user, and possible income to the postal service. Second, the user may be aware of the error display but may not be knowledgeable enough to initiate the service call. This is particularly true for meter designs that simply display the fault's error code. Third, to provide a higher level of service, the meter lessor has a strong interest to know when a meter has been tampered with or is non-functional so that corrective actions can be taken immediately.

SUMMARY OF THE INVENTION

The present invention is a novel and improved method and apparatus for performing automated fraud reporting. In one configuration, the meter is a stand-alone unit that couples to a modem. In a second configuration, the meter couples to a mailing machine base. In a third configuration, the meter couples to a computer. In the second and third configurations, the meter, the base, and/or the computer can each couple to a modem. Alternatively, these units can share a modem that is coupled to one of the units. The modem connects to the service center through a wireline or wireless transmission system. The meter can communicate with the base or computer through a predetermined software protocol.

Security breaches and faults can be detected by various mechanisms including, but not limited to, (1) diagnostic software within the meter, the base, and/or computer, and (2) tamper-detection devices disposed throughout the meter. The detectable faults can be classified into one or more categories, or levels, to provide a postage metering system having varying levels of sensitivity in security breach detection, reporting, and handling.

As an example, the postage metering system can be designed having three levels of detected faults. The first level can include minor faults associated with no, or low, probability of tampering. An operator fix can be prompted before sending an alarm message to the service center. The second level can include intermediate faults associated with medium probability of tampering. An alarm message can be sent to the service center and corrective action can be taken in accordance with a response from the service center. The third level can include major faults associated with high probability of tampering. An alarm message can be sent to the service center as well as postal inspectors. In addition, the meter can be locked until service is performed.

The foregoing, together with other aspects of this invention, will become more apparent when referring to the following specification, claims, and accompanying drawings.

DETAILED DESCRIPTION OF THE SPECIFIC EMBODIMENTS

System Overview

A postage metering system can be designed in one of many configurations. In one configuration, a postage meter operates as a stand-alone unit and couples to a modem. The modem can communicate with one or more of the following entities: (1) a service center, (2) a central dispatch facility, (3) postal authorities, (4) the manufacturer, and the like. Hereinafter, these entities are collectively referred to as the "service center". Thus, the term service center is used to refer to any entity that may have a heed or desire to know about, or an ability to act on, a problem with a postage metering system.

In another configuration, the postage meter is a secured module that couples to a mailing machine base and functions in conjunction with the base. The meter communicates with the base through a software protocol. One such protocol is disclosed in U.S. Pat. No. 4,484,307 entitled "ELECTRONIC POSTAGE METER HAVING IMPROVED SECURITY AND FAULT TOLERANCE FEATURES", issued Nov. 20, 1984, assigned to the assignee of the present invention and incorporated herein by reference. In one variant of this configuration, the meter is not directly coupled to a modem and connects to the service center through a modem in the base. In a second variant, the meter and base couple to respective modems and are able to independently communicate with the service center through the respective modems. The meter and base can also operably couple to the other unit's modem, i.e., through the software protocol between the units, so that if one modem fails, the remaining modem can be used by both units. For example, if the modem coupled to the meter fails, the meter is still able to communicate with the service center through the modem coupled to the base. This cross-coupling feature provides added redundancy and increases system reliability.

In yet another configuration, the postage meter is a secured module that attaches to a computer (PC). This is also referred to as the secured module/computer configuration. In this configuration, there is no "base" as such. The computer controls a print mechanism within the meter. A modem, either internal or external, is a peripheral device that couples to the computer and allows the computer to communicate with the service center.

As used herein, meter generically refers to (1) a postage meter, (2) a secured module, (3) a secure metering device (SMD), and others. An SMD is a class of computer peripherals that performs the security functions of postage metering systems. Examples of SMD are closed system secured device (CSSD) and postage secured device (PSD). Similarly, as used herein, "base" generically refers to (1) a mailing machine base, (2) a computer, and others.

Figure 1:
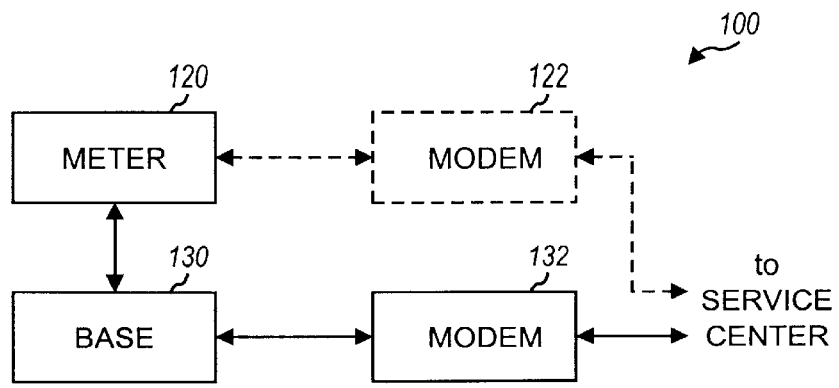
FIG. 1 is a block diagram illustrating several possible configurations of a postage metering system.

FIG. 1 is a block diagram illustrating several possible configurations of a postage metering system 100. Postage metering system 100 includes a meter 120 coupled to a base 130. Base 130 couples to a modem 132. Meter 120 can also couple to an associated modem 122. FIG. 1 illustrates some example configurations of postage meter system 100. Other configurations can be designed, as described above.

The modems can be a wireline connection, such as a telephone company connection using a standard telephone line, or a wireless connection. The modem can provide a direct connection to the service center or an indirect connection through a communication network, such as the Internet. Through the modem, the meter and the base are able to place automatic service calls to the service center.

It may be desirable to use a postage metering system, such as postage metering system 100, in a mobile environment. For example, the postage metering system may be moved from site to site by the user, and some sites may not be equipped with a wireline connection. Also, the service center may determine that it is more efficient to operate mobile service teams. For these reasons, it is advantageous to have a postage metering system that is able to communicate to the service center using a wireless link. One example of a wireless modem link is a wireless service dispatch system.

Figure 2:
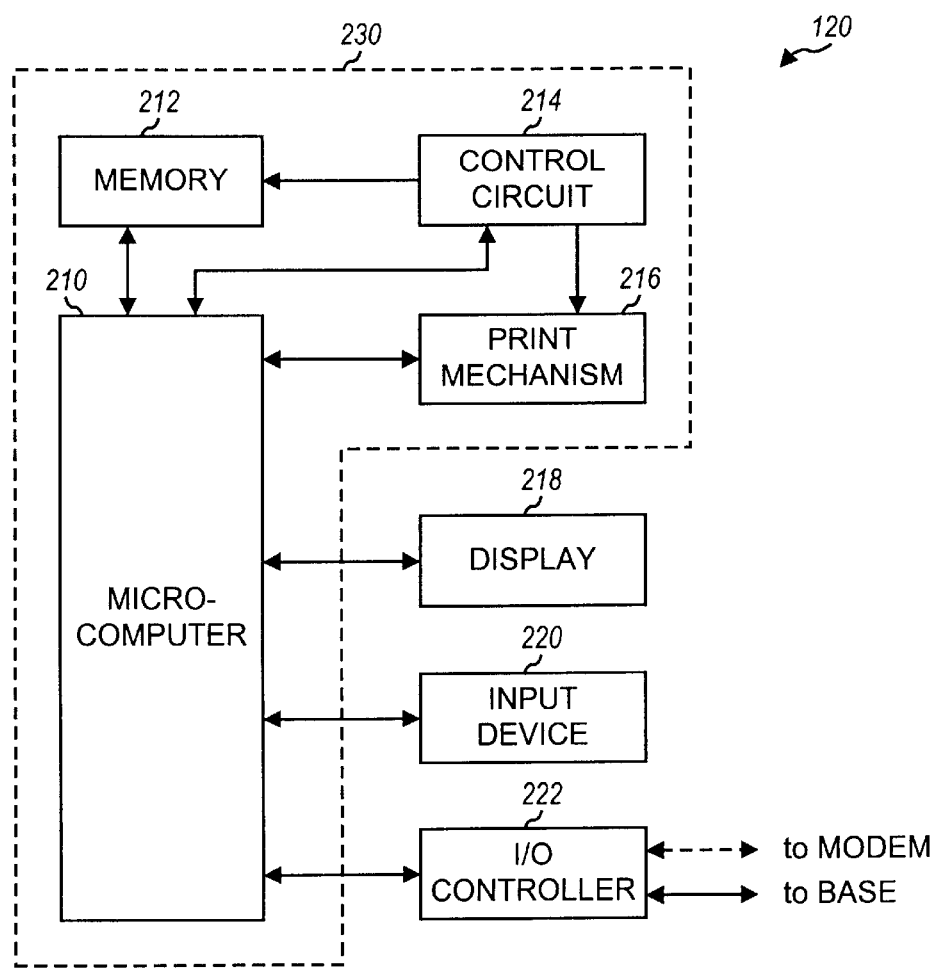
FIG. 2 is a block diagram illustrating the basic subsystems of one embodiment of the postage meter.

FIG. 2 is a block diagram illustrating the basic subsystems of one embodiment of meter 120. Meter 120 includes a microcomputer 210, a memory 212 for storing accounting information and/or program codes, a control circuit 214, a print mechanism 216 for printing value indicia (such as postage), a display 218 for displaying messages, an input device 220 for receiving commands from a user and/or service technician, an I/O controller 222 for interface to a base and/or a modem. Control circuit 214 receives and generates various timing and validation signals to prevent unauthorized actuation of print mechanism 216 and the unauthorized writing into accounting registers in memory 212.

Microcomputer 210 couples to memory 212, control circuit 214, print mechanism 216, display 218, input device 220, and I/O controller 222. Control circuit 214 also couples to memory 212 and print mechanism 216. Microcomputer 210, memory 212, control circuit 214, and print mechanism 216 can be enclosed inside a secured and tamper resistance housing 230.

Microcomputer 210 directs the operation of meter 120 and operates according to a program stored in an associated read-only-memory (ROM) and/or random-access-memory (RAM). These memories may be physically separate integrated circuits (e.g., memory 212) or may be integrated within microcomputer 210. Microcomputer 210 can be a microprocessor, a microcontroller, an applications specific integrated circuit, a digital signal processor, or the like. The operation of meter 120 is further described in the aforementioned U.S. Pat. No. 4,742,469.

Another example of a design of a postage meter is disclosed in U.S. Pat. No. 5,612,884 entitled "REMOTE METER OPERATION", issued Mar. 18, 1997, assigned to the assignee of the present invention and incorporated herein by reference. The meter disclosed in the '884 patent includes an input/output (I/O) port and is capable of communication with an external device, e.g. a modem. Generally, the inventive concept described herein can be applied to any meter design that supports communication with an external device.

Security Breaches

Security breach and fraud, as the terms are used in the present invention, include any event (or fault) affecting the normal operation of the meter that possibly relates to meter security. The fault can be detected by various detection mechanisms within the meter and/or the unit (e.g., the base or computer) coupled to the meter. These mechanisms include: (1) detection of meter faults by diagnostic software, (2) indication of occurrences of specific events by specially designed tamper detection devices, and so on. Examples of faults detected by each of these mechanisms are given below.

Security breaches can be detected by diagnostic software running within the microcomputer of the meter, the base, and/or the computer (depending on the meter configuration). Specifically, the meter is monitored periodically for faults that may indicate security beaches. The software performs checks (i.e., by polling) on various subsystems of the meter, such as the memory, the printing mechanism, and the microcomputer itself. Tampering can be detected by the presence of various specified fault states that are possibly triggered by attempts at tampering. One example of such fault is an excessive number of attempts at logging into the metering system.

As described herein, the diagnostic software includes routines that perform detection, diagnosis, and notification of various system faults. These faults can relate to tampering and/or malfunctions of the meter hardware as well as the various diagnostic software. The software can comprise microcodes that can be stored or hardwired within the microcomputer. Various implementations of the software can be contemplated by those skilled in the art and are within the scope of the present invention.

Security breaches can also be detected by dedicated tamper detection devices within the meter. One example is a cover switch that activates when the secured cover of the meter is dislodged. Another example is frangible tape that is used to detect tampering. Yet another example is a routine that detects when the accounting registers are modified without authorization. Although not shown in FIG. 2, these devices couple to the associated subsystems to which they apply and send alarm signals to control circuit 214 or microprocessor 210 when activated.

Fault States

The detectable faults are classified into one or more categories, or levels, to provide a postage meter having varying levels of sensitivity in security breach detection. By way of example, the detected breaches are categorized into three levels in the following discussion. The metering system can be designed with more or less number of levels.

The first level includes minor faults associated with low, or no, possibility of tampering. These faults are also referred to as "soft" faults. Generally, soft faults are noted and may require corrective actions. Also, the operator can be prompted to fix the fault. The following is a list of possible first level faults. This list is illustrative of first level faults, and is not an exhaustive list.

1. Presence of non-meaningful signals entering an input/output (I/O) port which can be indicative of an unauthorized attempt to tamper with the meter.
2. An absence of usual feedback signals from interfaced devices that can result from a meter running while being disconnected from the system.
3. Repeated power off/on without running the print cycles which is an abnormal mode of operation.
4. For a meter that is configured for a Computerized Meter Resetting System (CMRS) operation, the P.O. key is operated (i.e., there is an attempt to manually enter P.O. reset mode).

The second level includes intermediate faults associated with medium possibility of tampering. These faults are also referred to as "hard" faults. Generally, level two faults are investigated and are reported to the service center that determines the corrective action. The following is a list of possible second level faults. Again, this is only an illustrative list.

1. The presence of non-signal voltages on I/O pins, which can be indicative of probing.
2. A power on of the meter when the meter is not installed on a base (for a meter/base configuration), especially when the meter is not operating in P.O. Mode.
3. Repeated unsuccessful attempts to enter Supervisor Mode, Service Mode, or any password protected mode of operation.
4. Excessive number of zero imprints run at one time, which can be indicative that a method had been found to imprint other than zero (i.e., imprint without updating the accounting registers).
5. Unaccounted change in physical location.
6. Error detected in postage register computation, which can be indicative of a meter malfunction or tampering but would require a hard fault and factory service to clear.
7. Level one faults that are not resolved by the operator fixes.

The third level includes major faults associated with high possibility of tampering or possibility of a major security breach. These faults are also referred to as "hard" faults. Level three faults are generally reported to the service center as well as the regulating authority, such as postal inspectors. In addition, the meter is usually disabled until it is service by an authorized service technician. The following is a list of possible third level faults. Again, this is only an illustrative list.

1. Cover is opened.
2. Interior wiring or board interfaces are disconnected.
3. Repeated errors in operation while in P.O. Mode, indicating operation by someone not a postal employee. Typically, only postal employees can legitimately operate a meter in P.O. Mode.
4. Portions of circuitry are powered while other portions are not powered.
5. Repeated failed attempt at remote reset, especially if errors that cause the failure are different every time, which can indicate experimentation.
6. Repeated physical shocks (e.g., hammer blows).
7. Tampering with the secured enclosure.
8. Attempts to set the accounting unit to an unauthorized value.
9. Attempts to prevent the operation of the accounting unit during the normal print cycle.
10. Failure of fault detection devices.
11. Failure of critical components (e.g., the printing mechanism, the memory, the microcomputer).
12. Level one and two faults that are not resolved can also be classified as level three faults.

System Operation

In the meter/base configuration, if a fault state identified as likely to be caused by tampering is set, the meter, if functional, sends an alarm message to the service center, through its own modem, if one exists. Similarly, if a dedicated tamper detection device is triggered, the meter, if functional, also sends an alarm message to the service center. Alternatively or additionally, the alarm message can be sent to the service center through the base modem, if one exists.

In the secured module/computer configuration, if a fault state identified as likely to be caused by tampering is set, the computer receives the alarm message and relays it to the service center via its modem. Similarly, activation of tamper detection devices in the secured module causes the computer to send an alarm message to the service center.

The diagnostic software within the base or computer periodically tests the meter and can identify fault states that are likely to result from tampering. The software can also detect the activation of the tamper detection devices. If the meter is non-functional, the base (or computer) can send an alarm message on behalf of the meter to the service center via the base (or computer) modem.

The alarm message can include information about the specific evidence that is detected such as: (1) the error codes for the detected faults and (2) the detection devices activated. The alarm message can also includes pertinent diagnostic data such as: (1) the model/serial number of the meter, (2) the location of the meter, (3) the time the error is detected, (4) the content of the postage registers, and so on. The diagnostic data allows the service center to diagnose the failure and to promptly and properly respond to the service call.

The response from the service center can be tailored according to the estimated degree of certainty that an attempt to defraud the meter has occurred. For example, tampering of the secured cover may justify a more immediate, and perhaps drastic, response. Alternatively, keyboard activity that may indicate an unsuccessful attempt at hacking, or nothing more than ineptitude on the part of the operator, may justify an intermediate response.

The service center can be programmed to respond to the alarm messages using some level of intelligence. For example, a plurality of detected faults, even minor, may justify an immediate response that would not be appropriate to any one of the detected faults. As another example, an alarm message from a meter located in a bad neighborhood may require more immediate response. Similarly, an alarm message received outside the expected normal operating hours of the meter may also merit more immediate response. The past history of the meter can be used to process and service the alarm message.

Security Breaches Detected by the Meter

Figure 3:
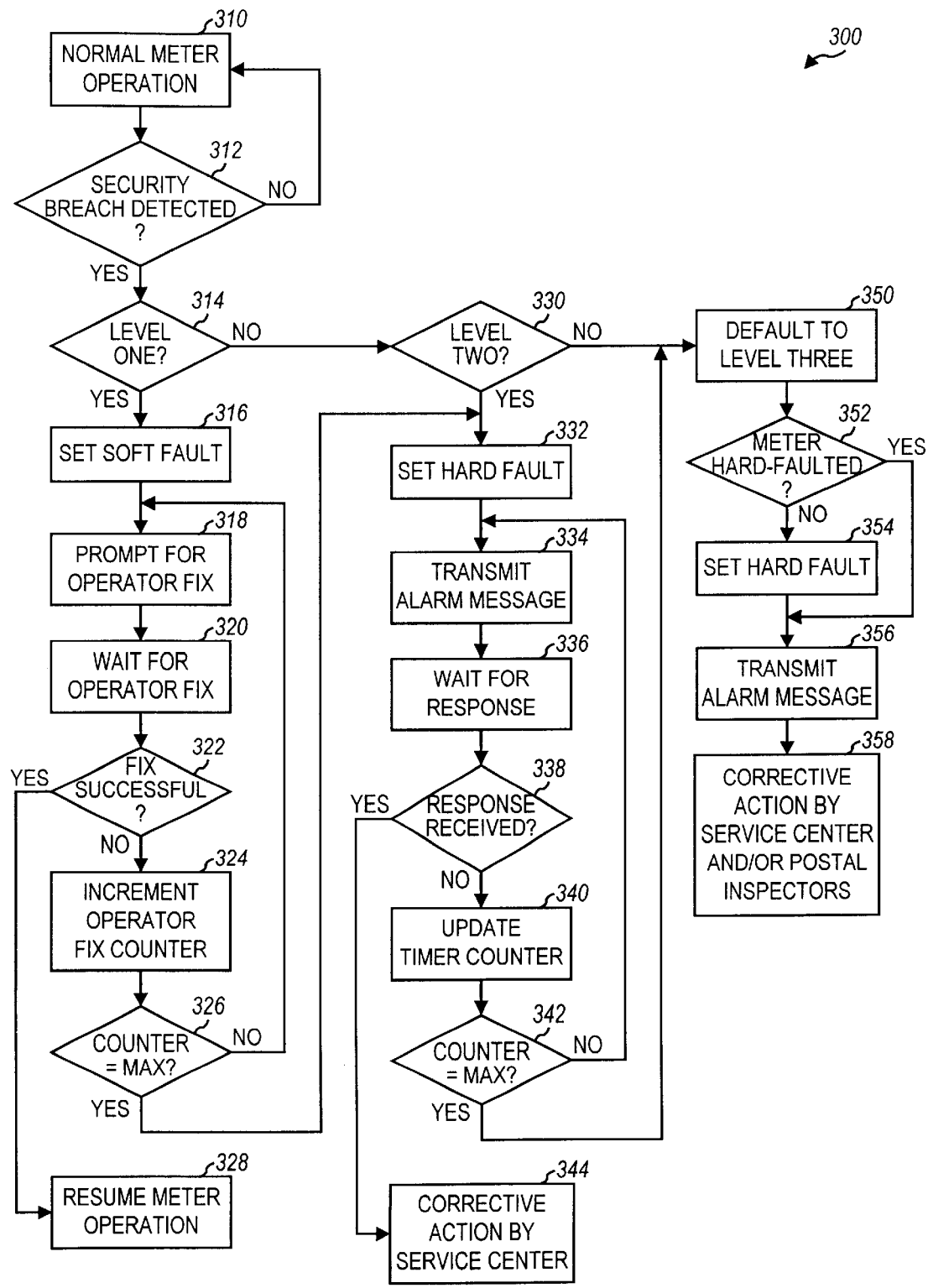
FIG. 3 is a flow diagram illustrating the detection and reporting of security breaches by the meter.

FIG. 3 shows a flow diagram 300 illustrating the operation of the routine for detection and reporting of security breaches by the meter. At a step 310, the meter operates in the normal manner. Periodically, at a step 312, the meter determines whether a security breach (or meter fault) has been detected by the meter security architecture (e.g., the diagnostic software and/or tamper detection devices). If no meter faults are detected, the meter returns to step 310 and resumes normal operation. Otherwise, if a meter fault is detected, the meter then determines, at a step 314, whether it is a level one breach. If a level one breach is not detected, the meter proceeds to a step 330. Otherwise, the meter proceeds to a step 316 where it sets the detected fault as a soft fault. The meter then prompts the operator, at a step 318, for an operator fix and waits, at a step 320, for this fix. At a step 322, the meter determines whether the operator fix cures the detected breach. If the operator fix is successful, the meter resumes operation, at a step 328. Otherwise, the meter increments an operator fix counter, at a step 324, and determines whether the operator fix counter equals the allowable maximum number, at a step 326. If the answer is no, the meter returns to step 318 to prompt for another operator fix. Otherwise, if the operator fix counter equals the maximum, the meter proceeds to step 332.

At step 330, the meter determines whether the detected breach is a level two breach. If a level two breach is not detected, the meter proceeds to a step 350. Otherwise, the meter proceeds to a step 332 where it sets a hard fault. The meter then transmits an alarm message to the service center, at a step 334, and waits for a response from the service center, at a step 336. At a step 338, the meter determines whether the response is received from the service center. If the response is received, the meter proceeds to a step 344 where it performs the corrective action indicated by the response from the service center. Alternatively, at step 344, the meter waits for the corrective action, e.g., from the service technician. At step 338, if the response is not received, the meter updates a timer counter, at a step 340. At a step 342, the meter determines whether the timer counter equals the allowable maximum count. If the answer is no, the meter returns to step 334 to retransmit the alarm message to the service center. Otherwise, if the timer counter equals the maximum, the meter proceeds to step 350.

At step 350, the meter sets the detected breach as a level three breach. At a step 352, the meter determines whether a meter hard fault has been detected. If the answer is yes, the meter proceeds to a step 356. Otherwise, if the answer is no, the meter sets the detected fault as a hard fault and also proceeds to step 356. A detected fault that has originally been set as a soft fault, at step 316, can subsequently be set as a hard fault by the meter if the maximum number of operator fixes fails to clear the fault.

At step 356, the meter transmits an alarm message to the service center. The meter can also transmit the alarm message to the postal inspectors. The meter then waits for corrective action by the service center and/or postal inspectors, at a step 358.

Security Breaches Detected by the Base and Computer

Figure 4:
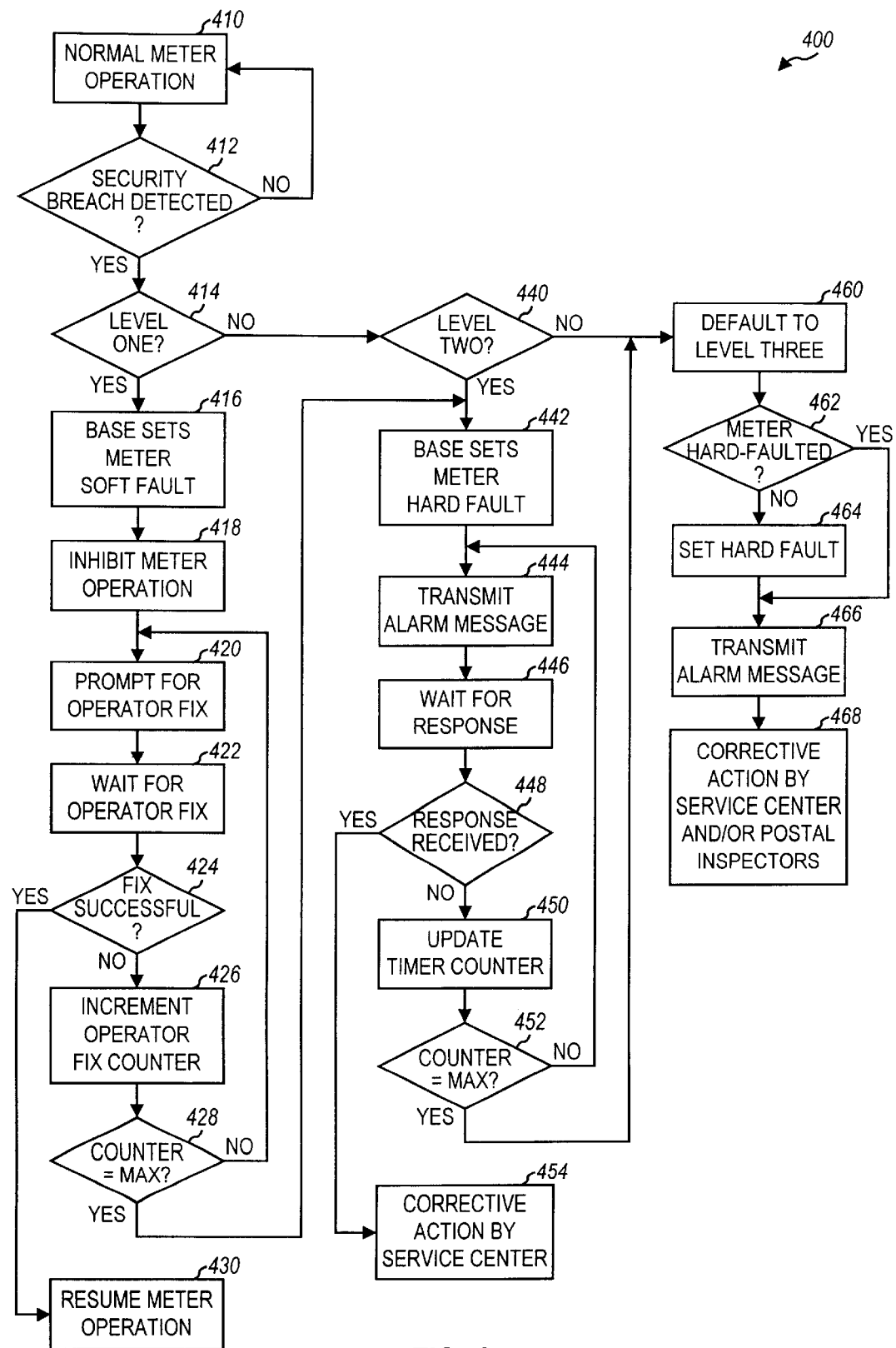
FIG. 4 is a flow diagram illustrating the detection and reporting of security breaches by the base.

FIG. 4 shows a flow diagram 400 illustrating the operation of the routine for detection and reporting of security breaches by the base (or the computer depending on the configuration). At a step 410, the meter operates in the normal manner. Periodically, at a step 412, the base determines whether a meter security breach (or meter fault) has been detected by the base security architecture. If no meter faults are detected, the base returns to step 410 wherein the meter continues to operate in the normal manner. Otherwise, if a meter fault is detected, the base then determines, at a step 414, whether it is a level one breach. If a level one breach is not detected, the base proceeds to a step 440. Otherwise, the base proceeds to a step 416 where it sets the detected breach as a meter soft fault. The base then inhibits normal operation of the meter, at step 418. At a step 420, the base prompts the operator for an operator fix and waits, at a step 422, for this fix. At a step 424, the base determines whether the operator fix cures the detected breach. If the operator fix is successful, the meter resumes operation, at a step 430. Otherwise, the base increments an operator fix counter, at a step 426, and determines whether the operator fix counter equals the allowable maximum number, at a step 428. If the answer is no, the base returns to step 420 where the base prompts for another operator fix. Otherwise, if the operator fix counter equals the maximum, the base proceeds to step 442.

At step 440, the base determines whether the detected breach is a level two breach. If a level two breach is not detected, the base proceeds to a step 460. Otherwise, the base proceeds to a step 442 where it sets the detected fault as a hard fault. The base then transmits an alarm message to the service center, at a step 444, and waits for a response from the service center, at a step 446. At a step 448, the base determines whether the response is received from the service center. If the response is received, the base proceeds to step 454 where it performs the corrective action indicated by the response from the service center. Alternatively, at a step 454, the base waits for the corrective action. At a step 452, if the response is not received, the base updates a timer counter at a step 45Q. At step 452, the base determines whether the timer counter equals the allowable maximum count. If the answer is no, the base returns to step 444 to retransmit the alarm message to the service center. Otherwise, if the timer counter equals the maximum, the base proceeds to step 460.

At step 460, the base sets the detected breach as a level three breach. At a step 462, the base determines whether a meter hard fault has been detected. If the answer is yes, the base proceeds to a step 466. Otherwise, if the answer is no, the base sets the detected fault as a hard fault and also proceeds to step 466. A detected fault that has originally been set as a soft fault, at step 416, can subsequently be set as a hard fault by the base if the maximum number of operator fixes fails to clear the fault.

At step 466, the base transmits an alarm message to the service center. The base can also transmit the alarm message to the postal inspectors. The base then waits for corrective action by the service center and/or postal inspectors, at a step 468.

The flow diagrams shown in FIGS. 3–4 are one example of each of two embodiments described herein. It will be obvious for those skilled in the art to modify the flow diagrams to match the particular design of the meter and base. Furthermore, the flow diagrams can be tailored to the particular system goals and requirements.

The automated fraud detection and reporting of the present invention allows for a robust design of the postage meter system. Traditionally, a fault caused by a breach in security causes the meter to lock up until a service call has been made, e.g., by the operator. A design choice must be made a priori whether a particular detected security breach should cause the meter to lock up (causing downtime) or be allowed to operate (possibly compromising security).

The automated fraud detection and reporting enables a more robust security system. The occurrence of specified faults causes an alarm message to be reported to the service center. The service center can perform diagnostics using the reported message. The service center can also perform additional diagnostic of the meter through the modem link to assess the severity of the security breach. For example, the service center can shut down a meter experiencing a series of minor faults, each of which by itself is not severe enough to justify the shut down. The service center can also take into account additional data known to it in assessing the condition. For example, the center may shut down a meter experiencing repeated faults indicating its unreliability.

The automated fraud detection and reporting of the present invention is especially suited for used in applications that require the reporting of meter failures. For example, the U.S. Postal system mandates that a security breach of the postage metering system be reported quickly after a detection of the breach. The automated reporting by the meter and/or the base can be automatically logged by the service center. The service center then uses the data to prepare the required report to the governing authority.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. For example, the flow diagrams can be modified to match the particular postage meter system design, goals, or requirements. Thus, the present invention is not intended to be limited to the embodiments shown herein but is to be accorded the widest scope consistent with the principles and novel features disclosed herein.

What is claimed is:

1. A postage metering system for placing automated fraud reporting to a service center comprising:

a meter having a microprocessor; and a modem coupled to the meter;

wherein the microprocessor runs diagnostic software configured to perform periodic checks to detect security breaches, and wherein the meter sends an alarm message via the modem upon detection of particular ones of the detected security breaches.

2. The system of claim 1 wherein the modem is a wireless connection.

3. The system of claim 1 wherein the security breaches are categorized into a plurality of severity levels.

4. The system of claim 3 wherein the automatic fraud reporting is performed upon detection of hard faults.

5. The system of claim 3 wherein the meter is disabled upon detection of hard faults.

6. The system of claim 3 wherein the detected fault increases in severity level if corrective action is not successful.

7. The system of claim 1 wherein the meter awaits an operator fix before sending the alarm message.

8. The system of claim 7 wherein the meter resumes operation upon a successful operator fix.

9. The system of claim 1 wherein the meter performs corrective action in accordance with a response from the service center responsive to the alarm message.

10. The system of claim 1 further comprising:

tamper detection devices coupled to subsystems within the meter for detecting security breach in the subsystems; and wherein the meter sends the alarm message via the modem upon activation of one or more of the tamper detection devices.

11. The system of claim 1 further comprising a counter, the counter being incremented, when the operator fix is unsuccessful, and wherein when the counter equals a predetermined maximum, a hard fault is set.

12. The system of claim 1 further comprising a timer counter for increasing a severity level, when the timer counter equals a predetermined timer count.

13. A postage metering system for placing automated fraud reporting to a service center comprising:

a meter having a microprocessor; and a modem coupled to the meter;

wherein the microprocessor runs diagnostic software configured to perform periodic checks of the meter to detect security breaches, the security breaches being categorized into three levels, wherein the meter sends an alarm message via the modem upon detection of security breaches within predetermined levels, and wherein the meter performs corrective action based on a response from the service center responsive to the alarm message.

14. The postage metering system of claim 13 wherein the three levels comprise an intermediate fault.

15. The postage metering system of claim 13 wherein the three levels comprise a first level having a low or no possibility of tampering, a second level having a medium possibility of tampering, and a third level having a high possibility of tampering.

16. A postage metering system for placing automated fraud reporting to a service center comprising:

a meter module;

a base coupled to the meter module, the base including a microprocessor; and a modem coupled to the base;

wherein the microprocessor runs test software configured to perform periodic checks of the meter to detect security breaches, and wherein the base sends an alarm message via the modem upon detection of particular ones of the detected security breaches.

17. The system of claim 16 wherein operation of the meter module is inhibited upon detection of the security breach.

18. The system of claim 16 wherein the security breaches are categorized into a plurality of severity levels.

19. The system of claim 16 wherein the automatic fraud reporting is performed upon detection of hard faults.

20. The system of claim 18 wherein an operator fix is requested upon detection of soft faults.

21. The system of claim 16 further comprising:
    tamper detection devices coupled to subsystems within the meter module for detecting security breach in the subsystems; and
    wherein the base sends the alarm message upon activation of one or more of the tamper detection devices.

22. A postage metering system for placing automated fraud reporting to a service center comprising:
    a meter module;
    a computer coupled to the meter module, the computer including a microprocessor; and
    a modem coupled to the computer;
    wherein the microprocessor runs test software configured to perform periodic checks of the meter to detect security breaches, and wherein the computer sends an alarm message via the modem upon detection of particular ones of the detected security breaches.

23. The system of claim 22 further comprising:
    tamper detection devices coupled to subsystems within the meter module for detecting security breach in the subsystems; and
    wherein the computer sends the alarm message upon activation of one or more of the tamper detection devices.

24. A postage metering system for placing automated fraud reporting to a service center comprising:
    a meter module including a first microprocessor;
    a first modem coupled to the meter;
    a base coupled to the meter module, the base including a second microprocessor; and
    a second modem coupled to the base;
    wherein the first microprocessor runs diagnostic software configured to perform periodic checks of the meter module to detect security and meter failures, the meter module sending an alarm message via the first modem upon detection of particular ones of the detected meter failures;
    wherein the second microprocessor runs test software configured to perform periodic checks of the meter module to detect security and meter failures, the base also sending the alarm message via the second modem upon detection of particular ones of the detected meter failures.

25. The system of claim 20 wherein the failures are categorized into hard and soft faults.

26. The system of claim 25 wherein the automatic fraud reporting is performed upon detection of hard faults.

27. The postage metering system of claim 24 wherein the base further comprises a mailing machine.

28. The postage metering system of claim 24 wherein the meter further comprises a selection from a group consisting of a postage meter, a secured module, or a secure metering device.

29. A method for placing automated fraud reporting in a postage metering system including a meter and a modem comprising:
    performing a check of the meter using diagnostic software;
    detecting a fault within the meter;
    sending an alarm message via the modem coupled to the meter upon detection of particular ones of the detected faults;
    waiting for a response from the service center; and
    repeating the sending and waiting steps until the response is received from the service center.

30. The method of claim 29 further comprising:
    determining whether the detected fault is a hard fault; and
    disabling operation of the meter upon detection of the hard fault.

31. The method of claim 29 further comprising:
    monitoring the detected fault; and
    resuming operation of the meter upon detection of clearance of the detected fault.

32. The method of claim 29 further comprising:
    resetting the meter upon detection of the fault; and
    resuming operation of the meter upon a successful reset.

33. A method for placing automated fraud reporting in a postage metering system including a meter and a modem comprising:
    performing a check of the meter using diagnostic software;
    detecting a fault within the meter;
    determining whether the detected fault is a hard fault;
    disabling operation of the meter upon detection of the hard fault; and
    sending an alarm message via the modem connected to the meter upon detection of the hard fault.

34. A postage metering system for placing automated fraud reporting to a service center comprising:
    a meter having a microprocessor; and
    a modem coupled to the meter;
    wherein the microprocessor runs diagnostic software configured to perform periodic checks to detect security breaches, and wherein the meter sends an alarm message via the modem upon detection of particular ones of the detected security breaches; and
    wherein the service center provides a corrective action responsive to the alarm message, and wherein the corrective action is communicated to the meter via the modem.

* * * * *